(12) United States Patent
Nagata et al.

(10) Patent No.: US 12,325,441 B2
(45) Date of Patent: Jun. 10, 2025

(54) CABIN MANAGEMENT APPARATUS, METHOD, AND NON-TRANSITORY COMPUTER READABLE MEDIUM

(71) Applicant: TOYOTA JIDOSHA KABUSHIKI KAISHA, Toyota (JP)

(72) Inventors: Yu Nagata, Chofu (JP); Tomoyuki Kozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 18/382,595

(22) Filed: Oct. 23, 2023

(65) Prior Publication Data

US 2024/0140467 A1 May 2, 2024

(30) Foreign Application Priority Data

Oct. 27, 2022 (JP) .................................. 2022-172744

(51) Int. Cl.
- *B60W 50/14* (2020.01)
- *B60W 30/14* (2006.01)
- *B60W 40/08* (2012.01)
- *B60W 60/00* (2020.01)

(52) U.S. Cl.
CPC .......... *B60W 50/14* (2013.01); *B60W 30/146* (2013.01); *B60W 40/08* (2013.01); *B60W 60/00253* (2020.02); *B60W 2040/0881* (2013.01); *B60W 2540/043* (2020.02); *B60W 2540/049* (2020.02); *B60W 2540/227* (2020.02)

(58) Field of Classification Search
None
See application file for complete search history.

(56) References Cited

U.S. PATENT DOCUMENTS

| | | | |
|---|---|---|---|
| 2019/0176837 A1* | 6/2019 | Williams | G06V 20/593 |
| 2019/0258263 A1* | 8/2019 | Wendel | B60R 21/01556 |
| 2022/0176768 A1 | 6/2022 | Hokai et al. | |
| 2022/0221867 A1* | 7/2022 | Taveira | G05D 1/617 |

FOREIGN PATENT DOCUMENTS

JP 2022-091581 A 6/2022

* cited by examiner

*Primary Examiner* — Thomas S McCormack
(74) *Attorney, Agent, or Firm* — Dinsmore & Shohl LLP (57) ABSTRACT

A cabin management apparatus according to the present disclosure is a cabin management apparatus configured to manage a cabin of a vehicle, the cabin management apparatus including an acquisition interface, a communication interface, an output interface, and a controller, wherein the controller is configured to acquire, by the acquisition interface, passenger information including a characteristic and/or a boarding position of a passenger in the cabin, receive, by the communication interface, travel event information regarding a travel event that can occur during travel of the vehicle, and provide, by the output interface based on the travel event information, a notification that is different depending on the passenger information, in the cabin.

6 Claims, 4 Drawing Sheets

CABIN MANAGEMENT APPARATUS, METHOD, AND NON-TRANSITORY COMPUTER READABLE MEDIUM

CROSS-REFERENCE TO RELATED APPLICATION

This application claims priority to Japanese Patent Application No. 2022-172744, filed on Oct. 27, 2022, the entire contents of which are incorporated herein by reference.

TECHNICAL FIELD

The present disclosure relates to a cabin management apparatus, a method, and a program.

BACKGROUND

In recent years, technology for remote control of vehicles by operators is known. For example, Patent Literature (PTL) 1 discloses an automated driving vehicle with a communication interface that communicates with an operator.

CITATION LIST

Patent Literature

PTL 1: JP 2022-091581 A

SUMMARY

With practical application of technology for remote control of vehicles, there is a need to further improve the usefulness of technology for managing cabins of the vehicles. For example, there is a need to reduce the anxiety of passengers in a cabin of a vehicle, which is associated with the loss of a person, such as a conductor or driver, who can manage the cabin, by remote control of the vehicle by an operator.

It would be helpful to improve the usefulness of technology for managing cabins of vehicles.

A cabin management apparatus according to an embodiment of the present disclosure is a cabin management apparatus configured to manage a cabin of a vehicle, the cabin management apparatus including:
an acquisition interface;
a communication interface;
an output interface; and
a controller,
wherein the controller is configured to:
  acquire, by the acquisition interface, passenger information including a characteristic and/or a boarding position of a passenger in the cabin;
  receive, by the communication interface, travel event information regarding a travel event that can occur during travel of the vehicle; and
  provide, by the output interface based on the travel event information, a notification that is different depending on the passenger information, in the cabin.

A method according to an embodiment of the present disclosure is a method performed by a cabin management apparatus including an acquisition interface, a communication interface, an output interface, and a controller, the cabin management apparatus being configured to manage a cabin of a vehicle, the method including:
acquiring, by the acquisition interface, passenger information including a characteristic and/or a boarding position of a passenger in the cabin;
receiving, by the communication interface, travel event information regarding a travel event that can occur during travel of the vehicle; and
providing, by the output interface based on the travel event information, a notification that is different depending on the passenger information, in the cabin.

A program according to an embodiment of the present disclosure is configured to cause a computer to execute operations, the computer including an acquisition interface, a communication interface, an output interface, and a controller, the computer being configured to manage a cabin of a vehicle, the operations including:
acquiring, by the acquisition interface, passenger information including a characteristic and/or a boarding position of a passenger in the cabin;
receiving, by the communication interface, travel event information regarding a travel event that can occur during travel of the vehicle; and
providing, by the output interface based on the travel event information, a notification that is different depending on the passenger information, in the cabin.

According to an embodiment of the present disclosure, the usefulness of technology for managing cabins of vehicles is improved.

DETAILED DESCRIPTION

Hereinafter, an embodiment of the present disclosure will be described.

Outline of Embodiment

Figure 1:
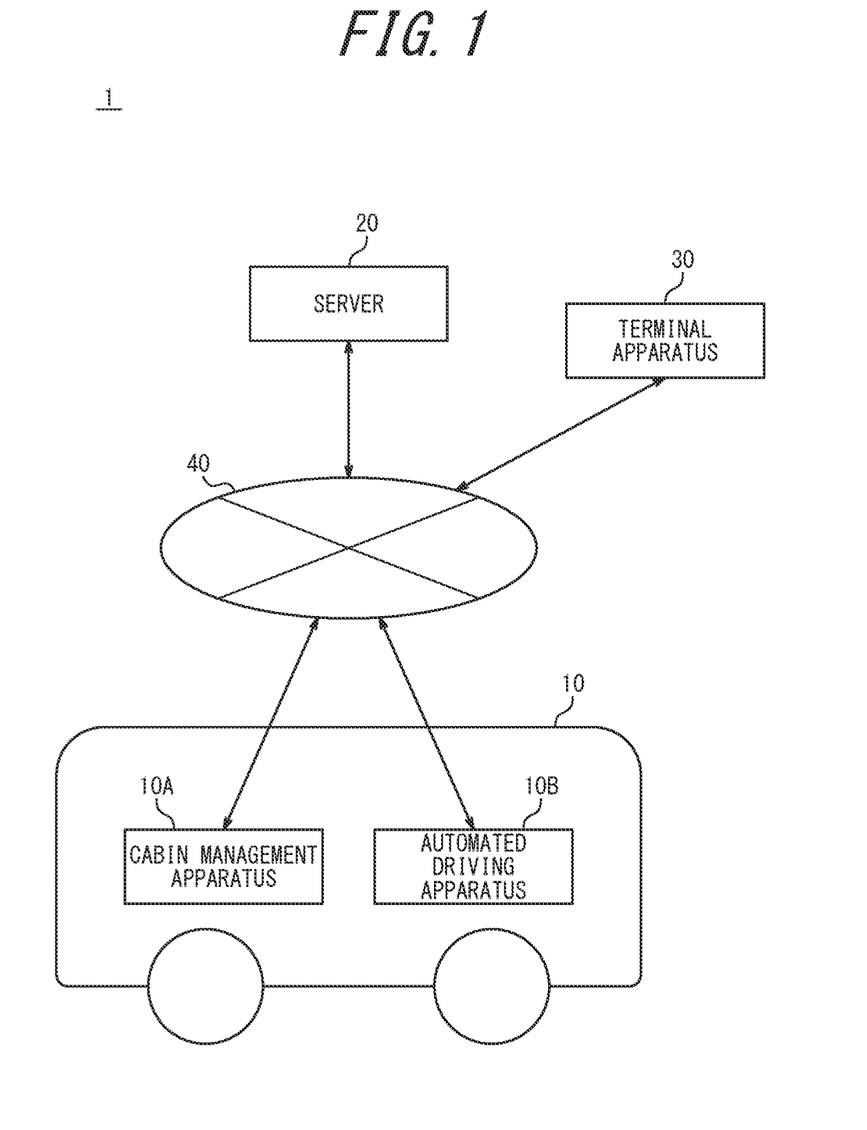
FIG. 1 is a block diagram illustrating a schematic configuration of a cabin management system according to an embodiment of the present disclosure.

With reference to FIG. 1, an outline of a cabin management system 1 according to an embodiment of the present disclosure will be described. FIG. 1 is a block diagram illustrating a schematic configuration of the cabin management system 1. The cabin management system 1 includes a vehicle 10, a server 20, and a terminal apparatus 30.

The vehicle 10 is, for example, a bus. However, the vehicle 10 is not limited to the bus, but may be any vehicle such as a passenger car, a motorcycle, or a truck. The vehicle 10 includes a cabin management apparatus 10A and an automated driving apparatus 10B. In other words, the cabin management apparatus 10A and the automated driving apparatus 10B are installed in the vehicle 10.

The cabin management apparatus 10A is configured to manage a cabin of the vehicle 10. The cabin management apparatus 10A may be, for example, a computer such as an Electronic Control Unit (ECU). The cabin is a space in the vehicle 10 in which persons on board the vehicle 10 stay.

The persons on board the vehicle 10 are hereinafter also referred to as passengers of the vehicle 10.

The automated driving apparatus 10B is configured to perform control related to automated driving of the vehicle 10. The automated driving apparatus 10B may be, for example, an Autonomous Driving System (ADS), Advanced Driver Assistance Systems (ADAS), or a computer such as ECU. The automated driving apparatus 10B allows the vehicle 10 to travel by automated driving. The automated driving level of the vehicle 10 may be, for example, Level 3 to Level 4 according to the level classification defined by the Society of Automotive Engineers (SAE).

More specifically, in the present embodiment, the vehicle 10 may be configured to travel by automated driving according to a travel plan, with remote control by a remote operator as needed. The vehicle 10 may be, for example, a bus that travels to stop, without a driver and conductor, boarding points or alighting points of the passengers on a travel route described in the travel plan. However, the automated driving level of the vehicle 10 is not limited to the levels described above. The vehicle 10 may be a vehicle 10 driven by a person with or without the assistance of the automated driving apparatus 10B.

The server 20 is constituted of one or more computers. In the present embodiment, the server 20 may be constituted of a single computer or multiple computers that can communicate with each other, such as a cloud computing system.

The server 20 assists the travel of the vehicle 10. In the following description, the server 20 is also referred to as a travel assistance apparatus. For example, the server 20 enables the remote control of the vehicle 10 by the operator via the terminal apparatus 30. For example, the server 20 also generates, updates, and manages the travel plan for the vehicle 10.

In the present embodiment, the "travel plan" for the vehicle 10 is a travel schedule for the vehicle 10. The travel plan for the vehicle 10 includes, for example, information on a departure point, a transit point, a destination point, a travel route along which the vehicle 10 travels, traffic rules, a travel time period, a scheduled departure time from the departure point, a scheduled arrival time at the transit point, a scheduled arrival time at the destination point, and the like. However, the travel plan for the vehicle 10 may include information other than the information described above.

The terminal apparatus 30 is a personal computer, for example, but not limited to this and may be any computer such as a smartphone or a tablet terminal. In the present embodiment, the terminal apparatus 30 is used by the operator who performs the remote control of the vehicle 10. The remote control of the vehicle 10 can include, for example, control over the travel of the vehicle 10, such as acceleration, deceleration, or steering of the vehicle 10. The remote control of the vehicle 10 can also include control other than the travel of the vehicle 10, such as opening and closing doors, confirming passenger seating, or making in-car announcements.

For the sake of simplicity, FIG. 1 illustrates one each of the vehicle 10, the server 20, and the terminal apparatus 30. However, the cabin management system 1 may include any number of vehicles 10, servers 20, and terminal apparatuses 30. The vehicle 10 (the cabin management apparatus 10A and the automated driving apparatus 10B), the server 20, and the terminal apparatus 30 are communicably connected to a network 40 including, for example, the Internet, a mobile communication network, or the like.

Although details will be described later, in the cabin management system 1 described above, the cabin management apparatus 10A is installed in the vehicle 10 and is used to manage the cabin of the vehicle 10 and to assist the passengers on board the vehicle 10. Specifically, the cabin management apparatus 10A acquires passenger information including a characteristic and/or a boarding position of each passenger in the cabin. Upon receiving travel event information regarding a travel event that can occur during the travel of the vehicle 10 from the server 20 or the automated driving apparatus 10B, for example, the cabin management apparatus 10A provides, based on the travel event information, a notification that is different depending on the passenger information, in the cabin. The travel event includes, for example, a sharp turn/hard braking, an emergency stop, or the like of the vehicle 10, but is not limited to these.

As described above, according to the present embodiment, when the travel event information regarding the travel event that can occur during the travel of the vehicle 10 is received, the appropriate notification can be provided in the cabin according to the passenger information on the vehicle 10. This reduces the anxiety of the passengers in the cabin, even when a person who can manage the cabin of the vehicle 10 is not on board the vehicle 10. Therefore, according to the present embodiment, the usefulness of technology for managing the cabin of the vehicle 10 can be improved.

Figure 2:
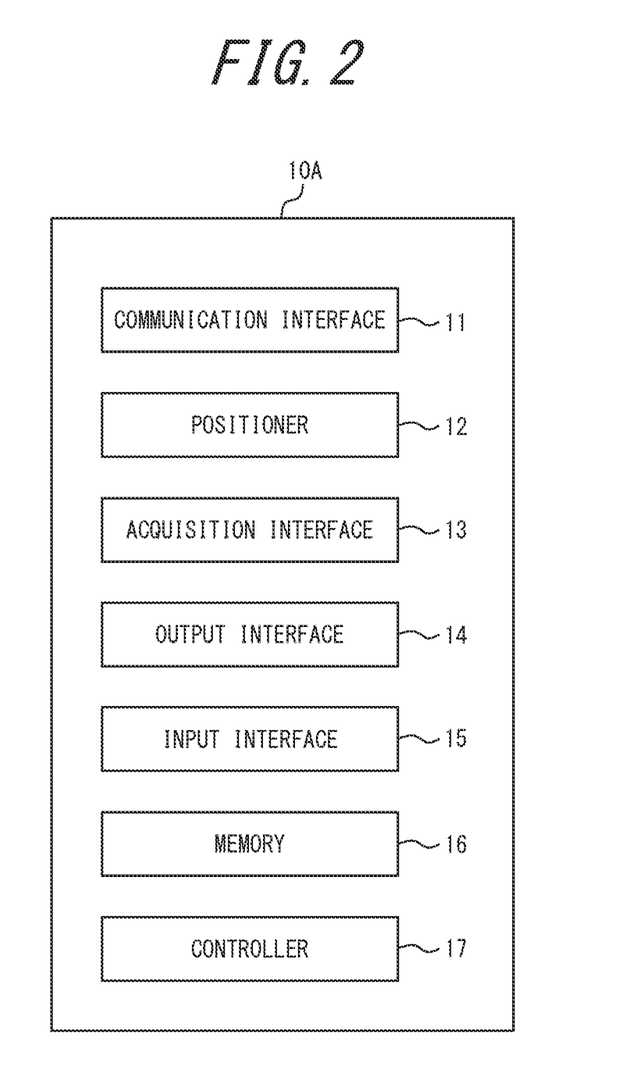
FIG. 2 is a block diagram illustrating a schematic configuration of a cabin management apparatus for a vehicle.
Figure 3:
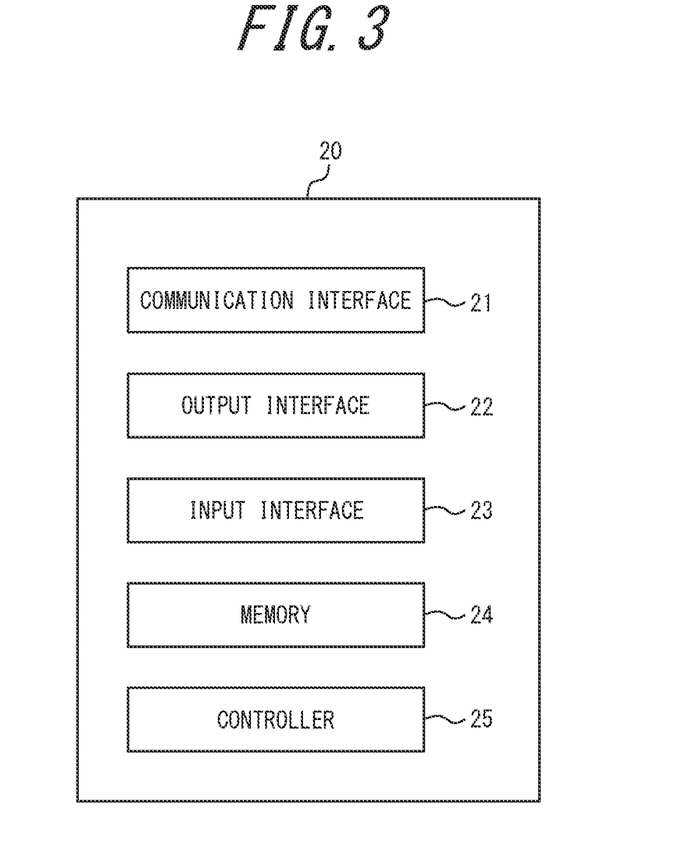
FIG. 3 is a block diagram illustrating a schematic configuration of a server.

Next, with reference to FIGS. 2 and 3, configurations of the cabin management system 1 will be described in detail. FIG. 2 is a block diagram illustrating a schematic configuration of the cabin management apparatus 10A of the vehicle 10. FIG. 3 is a block diagram illustrating a schematic configuration of the server 20.

(Configuration of Cabin Management Apparatus of Vehicle)

As illustrated in FIG. 2, the cabin management apparatus 10A of the vehicle 10 includes a communication interface 11, a positioner 12, an acquisition interface 13, an output interface 14, an input interface 15, a memory 16, and a controller 17. The communication interface 11, the positioner 12, the acquisition interface 13, the output interface 14, the input interface 15, the memory 16, and the controller 17 are communicably connected to each other via an in-vehicle network, such as a Controller Area Network (CAN), or dedicated lines, for example.

The communication interface 11 includes a communication module for connecting to the network 40. The communication module is, for example, a communication module compliant with a mobile communication standard such as the 4th Generation (4G) standard or the 5th Generation (5G) standard. The communication module may be, for example, a communication module compliant with a standard such as a wired Local Area Network (LAN) standard or a wireless LAN standard. The communication module may be a communication module compliant with a short-range wireless communication standard such as Wi-Fi® (Wi-Fi is a registered trademark in Japan, other countries, or both), Bluetooth® (Bluetooth is a registered trademark in Japan, other countries, or both), or an infrared communication standard. In the present embodiment, the cabin management apparatus 10A is connected to the network 40 via the communication interface 11. This enables the cabin management apparatus 10A to communicate with the server 20 or the like. The communication interface 11 of the cabin management apparatus 10A may be communicably connected to the automated driving apparatus 10B via an in-vehicle network such as CAN. This allows the cabin management apparatus 10A to communicate with the automated driving apparatus 10B or the like via the communication interface 11.

The positioner 12 includes one or more positioning apparatuses capable of generating positional information on the vehicle 10. The positional information on the vehicle 10 is, for example, coordinates such as the two-dimensional coordinates or three-dimensional coordinates of a location at which the vehicle 10 is present. The positioner 12 generates the positional information on the vehicle 10 by navigation using a satellite positioning system, autonomous navigation, or a combination of these. The positioner 12 may include a receiver compatible with a satellite positioning system such as the Global Positioning System (GPS) to generate the positional information on the vehicle 10 by navigation using the satellite positioning system. The positioner 12 may include a sensor such as an acceleration sensor or a gyro sensor, to generate the positional information on the vehicle 10 by autonomous navigation.

The acquisition interface 13 includes at least one sensor. The at least one sensor included in the acquisition interface 13 is located in such a position as to be able to acquire information in the cabin of the vehicle 10. For example, the sensor is a camera installed in such a position as to be able to capture images in the cabin of the vehicle 10. However, the sensor is not limited to the camera, but may be any sensor, such as a motion sensor, a contact sensor, a weight sensor, an infrared sensor, an illumination sensor, a gyro sensor, a door open/close sensor, or an IC card reader.

The output interface 14 includes at least one output apparatus. The output apparatus included in the output interface 14 is, for example, a display, a digital signage, a speaker, a lamp, or the like. The output interface 14 outputs images, sound, light, or the like.

The input interface 15 includes at least one input apparatus. The input apparatus included in the input interface 15 is, for example, a touch panel, a camera, a microphone, or the like. The input interface 15 accepts input operations by a user.

The memory 16 is, for example, a semiconductor memory, a magnetic memory, an optical memory, or the like. The memory 16 may function as, for example, a main memory, an auxiliary memory, or a cache memory. The memory 16 stores any information to be used for operations of the cabin management apparatus 10A. For example, the memory 16 stores a system program, an application program, embedded software, or the like. The information stored in the memory 16 may be updated with, for example, information acquired from the network 40 via the communication interface 11.

The controller 17 includes at least one processor. The processor may be, for example, a general purpose processor such as a Central Processing Unit (CPU), a dedicated processor that is dedicated to specific processing, or the like. The controller 17 is not limited to the processor and may include at least one dedicated circuit. The dedicated circuit may be, for example, a Field-Programmable Gate Array (FPGA) or an Application Specific Integrated Circuit (ASIC). The controller 17 controls the components including the communication interface 11, the positioner 12, the acquisition interface 13, the output interface 14, the input interface 15, and the memory 16, which are described above, in order to realize the functions of the cabin management apparatus 10A, including the functions of the components.

(Configuration of Server)

Next, with reference to FIG. 3, a configuration of the server 20 will be described in detail. FIG. 3 is a block diagram illustrating a schematic configuration of the server 20.

As illustrated in FIG. 3, the server 20 includes a communication interface 21, an output interface 22, an input interface 23, a memory 24, and a controller 25. The communication interface 21, the output interface 22, the input interface 23, the memory 24, and the controller 25 are communicably connected to one another with wires or wirelessly.

The communication interface 21 includes a communication module for connecting to the network 40. The communication module is, for example, a communication module compliant with a mobile communication standard such as the 4G standard or the 5G standard. The communication module may be, for example, a communication module compliant with a standard such as a wired LAN standard or a wireless LAN standard. The communication module may be a communication module compliant with a short-range wireless communication standard such as Wi-Fi®, Bluetooth®, or an infrared communication standard. In the present embodiment, the server 20 is connected to the network 40 via the communication interface 21. This allows the server 20 to communicate with the cabin management apparatus 10A and the automated driving apparatus 10B of the vehicle 10, as well as the terminal apparatus 30 and other devices.

The output interface 22 includes at least one output apparatus. The output apparatus included in the output interface 22 is, for example, a display, a speaker, a lamp, or the like. The output interface 22 outputs images, sound, light, or the like.

The input interface 23 includes at least one input apparatus. The input apparatus included in the input interface 23 is, for example, a touch panel, a camera, a microphone, or the like. The input interface 23 accepts input operations by a user.

The memory 24 is, for example, a semiconductor memory, a magnetic memory, an optical memory, or the like. The memory 24 may function as, for example, a main memory, an auxiliary memory, or a cache memory. The memory 24 stores any information to be used for operations of the server 20. For example, the memory 24 stores a system program, an application program, embedded software, or the like. The information stored in the memory 24 may be updated with, for example, information acquired from the network 40 via the communication interface 21.

The controller 25 includes at least one processor. The processor may be, for example, a general purpose processor such as a CPU, a dedicated processor that is dedicated to specific processing, or the like. The controller 25 is not limited to the processor and may include at least one dedicated circuit. The dedicated circuit may be, for example, an FPGA or an ASIC. The controller 25 controls the components including the communication interface 21, the output interface 22, the input interface 23, and the memory 24, which are described above, in order to realize the functions of the server 20, including the functions of the components.

(Operations of Cabin Management System)

Figure 4:
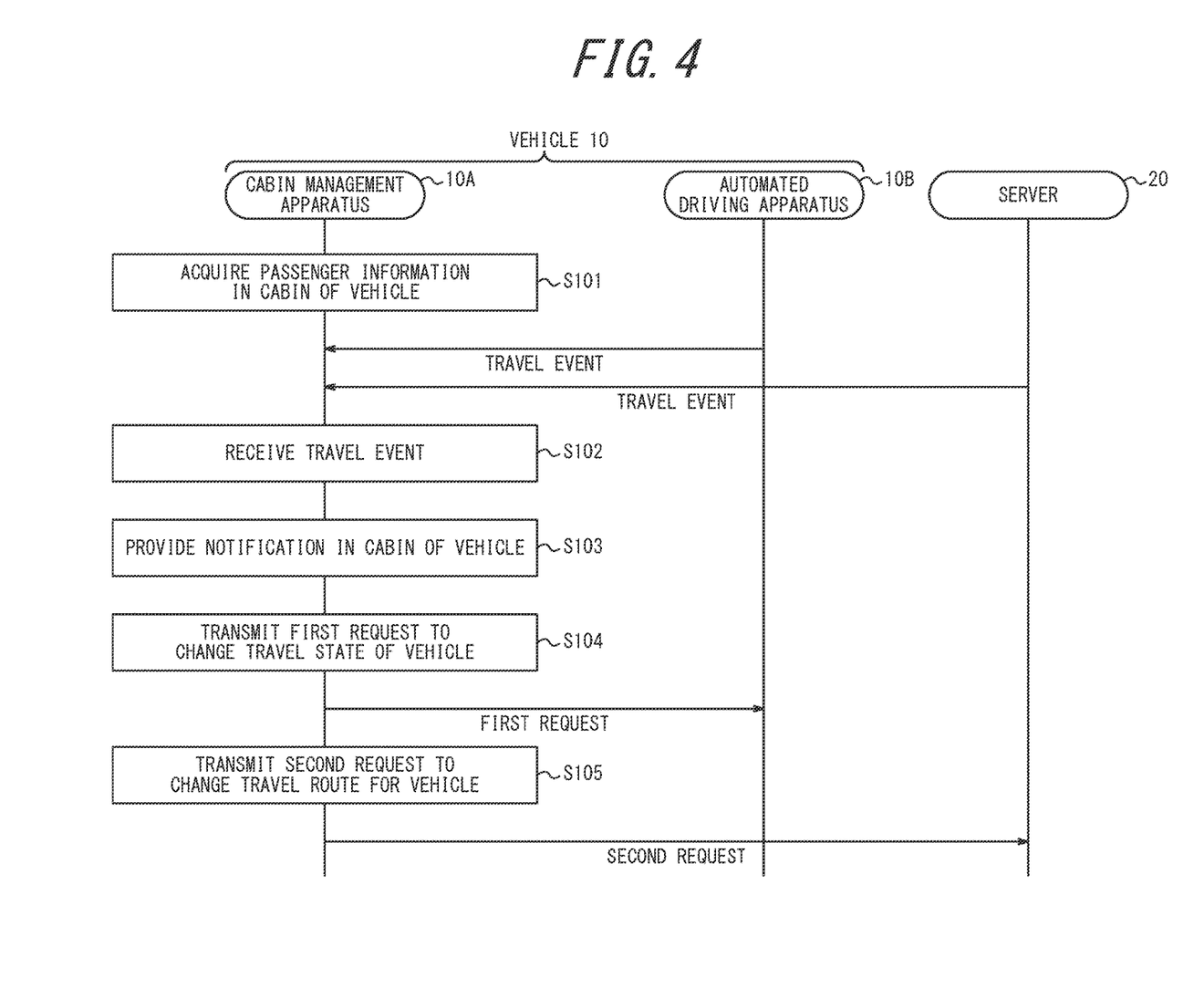
FIG. 4 is a flowchart illustrating operations of the cabin management system.

Operations for managing the cabin of the vehicle 10 by the cabin management system 1 will be described with reference to FIG. 4. FIG. 4 is a flowchart illustrating the operations of the cabin management system 1. The flowchart in FIG. 4 illustrates operations of the cabin management apparatus 10A and the automated driving apparatus 10B of the vehicle 10, and the server 20, which are included in the cabin management system 1. Therefore, the description of these operations corresponds to a method for controlling the cabin management system 1, and also corresponds to a method for controlling each of the cabin management apparatus 10A and the automated driving apparatus 10B of the vehicle 10, and the server 20, which are included in the cabin management system 1.

In this operation example, the vehicle 10 shall travel according to a travel plan for the vehicle 10. Then, the automated driving apparatus 10B shall perform control related to automated driving of the vehicle 10. The travel plan for the vehicle 10 includes information on a travel route along which the vehicle 10 travels and the like, as described above. The travel plan for the vehicle 10 shall be shared in advance by the cabin management apparatus 10A, the automated driving apparatus 10B, the server 20, and the terminal apparatus 30, which are included in the cabin management system 1.

In step S101, the controller 17 of the cabin management apparatus 10A acquires, by the acquisition interface 13, passenger information including characteristics and/or boarding positions of passengers in the cabin of the vehicle 10.

The passenger information on the vehicle 10 may include a characteristic of each passenger in the cabin of the vehicle 10. The characteristic of each passenger in the cabin of the vehicle 10 includes, for example, the age (e.g., whether the passenger is elderly or a child) or gender of the passenger, or whether the passenger requires assistance (e.g., whether the passenger uses a wheelchair or a stroller). The passenger information on the vehicle 10 may include a boarding position of each passenger in the cabin of the vehicle 10. The boarding position of each passenger in the cabin of the vehicle 10 includes, for example, information, such as coordinates, indicating the position of the passenger in the cabin, information indicating whether the passenger is seated on a seat or standing on a floor, or information indicating a direction to which the passenger is facing or the like. The passenger information on the vehicle 10 may include any other information regarding the passengers, such as the number of passengers or boarding points of the passengers, in addition to the above.

Any method can be employed to acquire the passenger information on the vehicle 10. For example, in a case in which the acquisition interface 13 of the cabin management apparatus 10A includes a camera, the controller 17 may capture, with the camera, images of the interior of the cabin of the vehicle 10. The controller 17 may identify, using an analysis algorithm, the passengers (and wheelchairs or strollers used by the passengers) in the images of the interior of the cabin of the vehicle 10 to determine the characteristics or boarding positions of the identified passengers. Alternatively, in a case in which the acquisition interface 13 of the cabin management apparatus 10A includes an IC card reader, the controller 17 may acquire, by the IC card reader as the characteristic of each passenger, information such as the age or gender of the passenger registered on an IC card held by the passenger. The controller 17 may store, in the memory 16, the acquired passenger information on the vehicle 10.

The analysis algorithm may be constructed by a statistical method such as machine learning or deep learning. For example, the analysis algorithm may be tuned by a statistical method based on a history of the passenger information generated in the past and the results of human evaluation on the passenger information. The accumulation of the history of the passenger information thereby allows to improve accuracy in acquisition of the passenger information. However, the analysis algorithm may be expressed by a predetermined relational formula that is not based on statistical methods.

The operation of step S101 described above may be repeated at predetermined times. For example, the operation of step S101 may be performed each time the vehicle 10 starts traveling after the vehicle 10 stops with opening and closing of the doors. In other words, the controller 17 of the cabin management apparatus 10A may acquire the passenger information by the acquisition interface 13 each time the vehicle 10 starts traveling after the vehicle 10 stops with opening and closing of the doors. The controller 17 can thereby update the passenger information at a time when the passengers get on/off the vehicle 10 and the passenger information may change, thus efficiently increasing the effectiveness of subsequent processing.

In step S102, the controller 17 of the cabin management apparatus 10A receives, by the communication interface 11, travel event information regarding a travel event that can occur during travel of the vehicle 10.

The travel event information on the vehicle 10 is information regarding an event that causes a change in a travel state of the vehicle 10 during the travel, by control such as a sharp turn/hard braking or an emergency stop of the vehicle 10, for example. The travel event information may include an estimated time of occurrence of the travel event and the details of the travel event. For example, the travel event may be an event that is foreseen to occur as a result of processing by the automated driving apparatus 10B or a remote operation by an operator. Alternatively, the travel event may be an event that is determined by the server 20 to be likely to occur based on road congestion, or the occurrence of an accident or construction work on the travel route for the vehicle 10.

The controller 17 of the cabin management apparatus 10A may receive, by the communication interface 11, the travel event information on the vehicle 10 from the server 20 or the automated driving apparatus 10B. For example, the automated driving apparatus 10B may generate the travel event information for a sharp turn of the vehicle 10 at a time when the automated driving apparatus 10B predicts the occurrence of the sharp turn at a curve 30 meters ahead. In such a case, the travel event information is transmitted from the automated driving apparatus 10B to the cabin management apparatus 10A. Alternatively, the terminal apparatus 30 may accept an input operation for an emergency stop by the operator, and the server 20 may generate the travel event information for an emergency stop of the vehicle 10 at a time when the input operation is transmitted from the terminal apparatus 30 to the server 20. In such a case, the travel event information is transmitted from the server 20 to the cabin management apparatus 10A. The controller 17 of the cabin management apparatus 10A may store, in the memory 16, the received travel event information on the vehicle 10. However, the cabin management apparatus 10A may acquire the travel event information from a computer other than the server 20 or the automated driving apparatus 10B.

In step S103, the controller 17 of the cabin management apparatus 10A provides, by the output interface 14 based on the travel event information, a notification that is different depending on the passenger information, in the cabin of the vehicle 10.

Any method can be used to provide the notification in the cabin of the vehicle 10. For example, in a case in which the output interface 14 of the cabin management apparatus 10A includes a digital signage, the controller 17 may display information regarding the travel event on the digital signage. For example, in a case in which the output interface 14 of the cabin management apparatus 10A includes a speaker, the controller 17 may output information regarding the travel event from the speaker.

At this time, the controller 17 of the cabin management apparatus 10A can change the notification by the output interface 14 according to the passenger information.

As an example, in step S103, the output interface 14 of the cabin management apparatus 10A may be configured to be capable of providing multiple patterns of notifications that are different depending on the boarding positions of the passengers. The controller 17 may provide, by the output interface 14 by priority, a notification to which a larger number of passengers correspond, among the multiple patterns of notifications.

For example, the controller 17 of the cabin management apparatus 10A may store, in the memory 16, the following boarding positions of passengers: (Case 1) a passenger is seated on a seat installed facing the front of the vehicle 10, (Case 2) a passenger is seated on a seat installed facing the side of the vehicle 10, (Case 3) a passenger is standing on a floor of the cabin of the vehicle 10. The controller 17 may store different notification patterns associated with respective Cases 1 to 3. For example, Case 1 may be associated with a notification pattern that encourages the passengers to secure bodies with seat belts or the like to prevent the passengers from being thrown to the floor during hard braking. Case 2 may be associated with a notification pattern that encourages the passengers to secure bodies with seat belts or the like to prevent the passengers from being thrown to the floor when entering a sharp curve. Case 3 may be associated with a notification pattern that encourages the passengers to grab handrails or straps to prevent the passengers from falling over, both during hard braking and when entering a sharp curve.

Any method can be employed to provide, by priority, a notification to which a larger number of passengers correspond. For example, upon receiving the travel event information, the controller 17 of the cabin management apparatus 10A may provide, based on the passenger information, a limited notification in which a notification pattern associated with a case to which the largest number of passengers correspond is selected. Alternatively, the controller 17 may provide, based on the passenger information, an ordered notification in which notification patterns associated with respective cases are used in order of decreasing the number of corresponding passengers. In addition, the controller 17 may employ either the limited notification or the ordered notification described above, depending on the time remaining until the estimated time of occurrence of the travel event included in the travel event information. This can reduce the anxiety of more passengers in situations in which time is limited before the travel event occurs.

As another example, in step S103, the output interface 14 of the cabin management apparatus 10A may include multiple output apparatuses that are installed to output information to different positions in the cabin. For example, the multiple output apparatuses may be installed in the cabin in a directional manner so that the passengers in the cabin receive output from the different output apparatuses depending on the boarding positions in Cases 1 to 3 above. This allows the cabin management apparatus 10A to provide appropriate notifications according to the boarding positions of the passengers.

However, a method of changing the notification by the output interface 14 according to the passenger information is not limited to the above example, and any method may be employed, such as changing wording, speed, or volume of a message to be output according to the ages of the passengers.

In step S104, upon receiving the travel event information with the passenger information on the vehicle 10 satisfying a first condition, in addition to/instead of the notification by the output interface 14, the controller 17 of the cabin management apparatus 10A transmits, by the communication interface 11 to the automated driving apparatus 10B, a first request to change the travel state of the vehicle 10 so as to avoid the travel event.

The first condition may be, for example, a condition indicating that a predetermined number or more passengers are standing. However, the first condition may be any condition indicating that there are a predetermined number or more passengers who may be injured when the travel event occurs. The controller 17 of the cabin management apparatus 10A determines whether the passenger information on the vehicle 10 satisfies the first condition. Upon receiving the travel event information with the passenger information on the vehicle 10 satisfying the first condition, the controller 17 transmits, by the communication interface 11 to the automated driving apparatus 10B, the first request to change the travel state of the vehicle 10 so as to avoid the travel event. The first request to change the travel state of the vehicle 10 is, for example, a request to reduce the travel speed of the vehicle 10 in advance in order to avoid a sharp turn/hard braking. In this way, the cabin management apparatus 10A can encourage the automated driving apparatus 10B, or a driver who drives the vehicle 10 using the automated driving apparatus 10B, to avoid the occurrence of the travel event by providing feedback according to circumstances in the cabin of the vehicle 10. However, the controller 17 may transmit the first request to a computer other than the automated driving apparatus 10B, such as the server 20.

In step S105, upon receiving the travel event information with the passenger information on the vehicle 10 satisfying a second condition, in addition to/instead of the notification by the output interface 14, the controller 17 of the cabin management apparatus 10A transmits, by the communication interface 11 to the server 20, a second request to change the travel route for the vehicle 10 so as to prioritize a road at which the vehicle 10 can stop.

The second condition may be, for example, a condition indicating that a predetermined number or more passengers are elderly or children. As an example, an elderly person may be 60 years of age or older and a child may be 10 years of age or younger. For example, the second condition may be a condition indicating that a predetermined number or more passengers can use strollers or wheelchairs. However, the second condition is not limited to the examples described above and may be any condition indicating that a predetermined number or more passengers may need assistance to evacuate from the vehicle 10 when the travel event occurs. The controller 17 of the cabin management apparatus 10A determines whether the passenger information on the vehicle 10 satisfies the second condition. Upon receiving the travel event information with the passenger information on the vehicle 10 satisfying the second condition, the controller 17 transmits, by the communication interface 11 to the server 20, the second request to change the travel route for the vehicle 10 so as to prioritize a road at which the vehicle 10 can stop. The second request to change the travel route for the vehicle 10 may be a request to set the travel route with priority, for example, on a road at which the passengers can easily evacuate from the vehicle 10. The road at which the passengers can easily evacuate from the vehicle 10 can include, for example, a roadway along which there is a place at which the vehicle 10 can stop in an emergency, such as in front of a train station, a park, and a vacant lot. For example, the road at which the passengers can easily evacuate from the vehicle 10 can include a road that is free of guardrails that could hinder alighting of the passengers, or a road at which there are many pedestrians who can be asked for assistance when the passengers evacuate. In this way, the cabin management apparatus 10A can encourage the server 20 to limit damage in the event of the travel event, by providing feedback based on the circumstances in the cabin of the vehicle 10. However, the controller 17 may transmit the second request to a computer other than the server 20, such as the automated driving apparatus 10B.

As described above, the cabin management apparatus 10A according to the present embodiment manages the cabin of the vehicle 10. Specifically, the cabin management apparatus 10A acquires the passenger information including the characteristic and/or the boarding position of each passenger in the cabin. Upon receiving the travel event information regarding the travel event that can occur during the travel of the vehicle 10, the cabin management apparatus 10A provides, based on the travel event information, the notification that is different depending on the passenger information, in the cabin.

According to such a configuration, when information on the travel event that can occur during the travel of the vehicle 10 is received, an appropriate notification can be provided in the cabin according to the passenger information on the vehicle 10. Therefore, according to the present embodiment, the anxiety of the passengers in the cabin can be reduced, even when a person who can manage the cabin of the vehicle 10 is not on board the vehicle 10. Therefore, according to the present embodiment, the usefulness of technology for managing the cabin of the vehicle 10 can be improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which a general purpose computer functions as the cabin management apparatus 10A according to the above embodiment can also be implemented. Specifically, a program in which processes for realizing the functions of the cabin management apparatus 10A according to the above embodiment are written may be stored in a memory of a general purpose computer, and the program may be read and executed by a processor. Accordingly, the present disclosure can also be implemented as a program executable by a processor, or a non-transitory computer readable medium storing the program. Examples of the non-transitory computer readable medium include a magnetic storage device, an optical disc, a magneto-optical storage medium, and a semiconductor memory.

For example, in the embodiment described above, the cabin management apparatus 10A and the automated driving apparatus 10B are installed in the vehicle 10, but are not limited to this. The server 20 may be configured to execute some or all of the operations and processing executed by the cabin management apparatus 10A or the automated driving apparatus 10B. This reduces processing loads on the apparatuses installed in the vehicle 10 and reduces manufacturing costs of the vehicle 10. Similarly, an apparatus installed in the vehicle 10, such as the cabin management apparatus 10A or the automated driving apparatus 10B, may be configured to execute some of the operations and processing executed by the server 20. For example, the processes described as executed by the server 20, such as generating, updating, and managing a travel plan for the vehicle 10, may be executed by a car navigation system installed in the vehicle 10. In other words, the car navigation system installed in the vehicle 10 may execute some or all of the operations and processes executed by the server 20, as a travel assistance apparatus configured to set a travel route for the vehicle 10. This reduces the amount of communication between the vehicle 10 and the server 20, thereby reducing processing delays or operating costs in the cabin management system 1.

For example, in the embodiment described above, the cabin management apparatus 10A and the automated driving apparatus 10B are separately installed in the vehicle 10, but are not limited to this. The cabin management apparatus 10A and the automated driving apparatus 10B may be installed in the vehicle 10 as a single unit. For example, the cabin management apparatus 10A may be configured to execute some or all of the operations and processing executed by the automated driving apparatus 10B.

Examples of some embodiments of the present disclosure are described below. However, it should be noted that the embodiments of the present disclosure are not limited to these examples.

[Appendix 1] A cabin management apparatus configured to manage a cabin of a vehicle, the cabin management apparatus comprising:
an acquisition interface;
a communication interface;
an output interface; and
a controller,
wherein the controller is configured to:
acquire, by the acquisition interface, passenger information including a characteristic and/or a boarding position of a passenger in the cabin;
receive, by the communication interface, travel event information regarding a travel event that can occur during travel of the vehicle; and
provide, by the output interface based on the travel event information, a notification that is different depending on the passenger information, in the cabin.

[Appendix 2] The cabin management apparatus according to appendix 1, wherein the controller is configured to acquire, by the acquisition interface,
the passenger information each time the vehicle starts traveling after the vehicle stops with opening and closing of a door.

[Appendix 3] The cabin management apparatus according to appendix 1 or 2, wherein
the communication interface is configured to be communicable with an automated driving apparatus configured to perform control related to automated driving of the vehicle, and
the controller is configured to, upon receiving the travel event information with the passenger information satisfying a first condition, transmit, by the communication interface to the automated driving apparatus, a first request to change a travel state of the vehicle so as to avoid the travel event.

[Appendix 4] The cabin management apparatus according to appendix 3, wherein the first condition is a condition indicating that a predetermined number or more passengers are standing.

[Appendix 5] The cabin management apparatus according to any one of appendices 1 to 4, wherein
the communication interface is configured to be communicable with a travel assistance apparatus configured to set a travel route for the vehicle, and
the controller is configured to, upon receiving the travel event information with the passenger information satisfying a second condition, transmit, by the communication interface to the travel assistance apparatus, a second request to change the travel route for the vehicle so as to prioritize a road at which the vehicle can stop.

[Appendix 6] The cabin management apparatus according to appendix 5, wherein the second condition is a condition indicating that a predetermined number or more passengers are elderly or children.

[Appendix 7] The cabin management apparatus according to any one of appendices 1 to 6, wherein
the output interface is configured to be capable of providing multiple patterns of notifications that are different depending on the boarding position of the passenger, and
the controller is configured to provide, by the output interface by priority, a notification to which a larger number of passengers correspond, among the multiple patterns of notifications.

[Appendix 8] A method performed by a cabin management apparatus including an acquisition interface, a communication interface, an output interface, and a controller, the cabin management apparatus being configured to manage a cabin of a vehicle, the method comprising:
acquiring, by the acquisition interface, passenger information including a characteristic and/or a boarding position of a passenger in the cabin;
receiving, by the communication interface, travel event information regarding a travel event that can occur during travel of the vehicle; and
providing, by the output interface based on the travel event information, a notification that is different depending on the passenger information, in the cabin.

[Appendix 9] The method according to appendix 8, comprising acquiring, by the acquisition interface, the passenger information each time the vehicle starts traveling after the vehicle stops with opening and closing of a door.

[Appendix 10] The method according to appendix 8 or 9, wherein
the communication interface is configured to be communicable with an automated driving apparatus configured to perform control related to automated driving of the vehicle, and
the method comprises, upon receiving the travel event information with the passenger information satisfying a first condition, transmitting, by the communication interface to the automated driving apparatus, a first request to change a travel state of the vehicle so as to avoid the travel event.

[Appendix 11] The method according to appendix 10, wherein the first condition is a condition indicating that a predetermined number or more passengers are standing.

[Appendix 12] The method according to any one of appendices 8 to 11, wherein
the communication interface is configured to be communicable with a travel assistance apparatus configured to set a travel route for the vehicle, and
the method comprises, upon receiving the travel event information with the passenger information satisfying a second condition, transmitting, by the communication interface to the travel assistance apparatus, a second request to change the travel route for the vehicle so as to prioritize a road at which the vehicle can stop.

[Appendix 13] The method according to appendix 12, wherein the second condition is a condition indicating that a predetermined number or more passengers are elderly or children.

[Appendix 14] The method according to any one of appendices 8 to 13, wherein
the output interface is configured to be capable of providing multiple patterns of notifications that are different depending on the boarding position of the passenger, and
the method comprises providing, by the output interface by priority, a notification to which a larger number of passengers correspond, among the multiple patterns of notifications.

[Appendix 15] A program configured to cause a computer to execute operations, the computer including an acquisition interface, a communication interface, an output interface, and a controller, the computer being configured to manage a cabin of a vehicle, the operations comprising:
acquiring, by the acquisition interface, passenger information including a characteristic and/or a boarding position of a passenger in the cabin;
receiving, by the communication interface, travel event information regarding a travel event that can occur during travel of the vehicle; and
providing, by the output interface based on the travel event information, a notification that is different depending on the passenger information, in the cabin.

[Appendix 16] The program according to appendix 15, wherein the operations comprise acquiring, by the acquisition interface, the passenger information each time the vehicle starts traveling after the vehicle stops with opening and closing of a door.

[Appendix 17] The program according to appendix 15 or 16, wherein
the communication interface is configured to be communicable with an automated driving apparatus configured to perform control related to automated driving of the vehicle, and
the operations comprise, upon receiving the travel event information with the passenger information satisfying a first condition, transmitting, by the communication interface to the automated driving apparatus, a first request to change a travel state of the vehicle so as to avoid the travel event.

[Appendix 18] The program according to appendix 17, wherein the first condition is a condition indicating that a predetermined number or more passengers are standing.

[Appendix 19] The program according to any one of appendices 15 to 18, wherein
the communication interface is configured to be communicable with a travel assistance apparatus configured to set a travel route for the vehicle, and the operations comprise, upon receiving the travel event information with the passenger information satisfying a second condition, transmitting, by the communication interface to the travel assistance apparatus, a second request to change the travel route for the vehicle so as to prioritize a road at which the vehicle can stop.

[Appendix 20] The program according to appendix 19, wherein the second condition is a condition indicating that a predetermined number or more passengers are elderly or children.

The invention claimed is:

1. A cabin management apparatus configured to manage a cabin of a vehicle, the cabin management apparatus comprising:
   an acquisition interface;
   a communication interface;
   an output interface; and
   a controller,
   wherein the controller is configured to:
      acquire, by the acquisition interface, passenger information including posture information of a passenger in the cabin;
      receive, by the communication interface, travel event information regarding a travel event that can occur during travel of the vehicle; and
      provide, by the output interface based on the travel event information, a notification that is different depending on the posture information, in the cabin.

2. The cabin management apparatus according to claim 1, wherein the controller is configured to acquire, by the acquisition interface, the passenger information each time the vehicle starts traveling after the vehicle stops with opening and closing of a door.

3. The cabin management apparatus according to claim 1, wherein
   the communication interface is configured to be communicable with an automated driving apparatus configured to perform control related to automated driving of the vehicle, and
   the controller is configured to, upon receiving the travel event information with the passenger information satisfying a first condition, transmit, by the communication interface to the automated driving apparatus, a first request to change a travel state of the vehicle so as to avoid the travel event.

4. The cabin management apparatus according to claim 3, wherein the first condition is a condition indicating that a predetermined number or more passengers are standing.

5. A cabin management apparatus configured to manage a cabin of a vehicle, the cabin management apparatus comprising:
   an acquisition interface;
   a communication interface configured to be communicable with a travel assistance apparatus configured to set a travel route for the vehicle;
   an output interface; and
   a controller, wherein:
   the controller configured to:
      acquire, by the acquisition interface, passenger information including a characteristic and/or a boarding position of a passenger in the cabin;
      receive, by the communication interface, travel event information regarding a travel event that can occur during travel of the vehicle; and
      provide, by the output interface based on the travel event information, a notification that is different depending on the passenger information, in the cabin,
      upon receiving the travel event information with the passenger information satisfying a condition, transmit, by the communication interface to the travel assistance apparatus, a request to change the travel route for the vehicle so as to prioritize a road at which the vehicle can stop, and
   the condition is a condition indicating that a predetermined number or more passengers satisfy a predetermined characteristic of the passengers.

6. A cabin management apparatus configured to manage a cabin of a vehicle, the cabin management apparatus comprising:
   an acquisition interface;
   a communication interface;
   an output interface; and
   a controller, wherein:
   the controller configured to:
      acquire, by the acquisition interface, passenger information including a characteristic and/or a boarding position of a passenger in the cabin;
      receive, by the communication interface, travel event information regarding a travel event that can occur during travel of the vehicle; and
      provide, by the output interface based on the travel event information, a notification that is different depending on the passenger information, in the cabin,
   the output interface is configured to be capable of providing multiple patterns of notifications that are different depending on the passenger information, and
   the controller is configured to provide, by the output interface by priority, a notification to which a larger number of passengers correspond, among the multiple patterns of notifications.

* * * * *